US012798996B2

(12) United States Patent
Wahlin

(10) Patent No.: US 12,798,996 B2
(45) Date of Patent: Nov. 17, 2026

(54) BEVERAGE CONTAINER

(71) Applicant: AARKE AB, Stockholm (SE)

(72) Inventor: Erik Wahlin, Värmdö (SE)

(73) Assignee: Aarke AB, Stockholm (SE)

( * ) Notice: Subject to any disclaimer, the term of this patent is extended or adjusted under 35 U.S.C. 154(b) by 385 days.

(21) Appl. No.: 18/550,926

(22) PCT Filed: Dec. 14, 2021

(86) PCT No.: PCT/EP2021/085604
§ 371 (c)(1),
(2) Date: Sep. 15, 2023

(87) PCT Pub. No.: WO2022/194411
PCT Pub. Date: Sep. 22, 2022

(65) Prior Publication Data
US 2024/0140823 A1 May 2, 2024

(30) Foreign Application Priority Data
Mar. 19, 2021 (SE) .................................... 2150319-8

(51) Int. Cl.
*C02F 1/00* (2023.01)

(52) U.S. Cl.
CPC ........ *C02F 1/003* (2013.01); *C02F 2201/003* (2013.01); *C02F 2201/004* (2013.01); *C02F 2307/04* (2013.01)

(58) Field of Classification Search
CPC ................ C02F 1/003; C02F 2201/003; C02F 2201/004; C02F 2307/04; A47G 19/12
See application file for complete search history.

(56) References Cited

U.S. PATENT DOCUMENTS 2,224,577 A 12/1940 Shively et al.
8,313,644 B2 * 11/2012 Harris ..................... C02F 1/002 210/205
9,045,353 B2 * 6/2015 Parekh ...................... C02F 1/42
(Continued)

FOREIGN PATENT DOCUMENTS

CA 3041496 A1 11/2019
CN 107205562 A 9/2017
(Continued)

OTHER PUBLICATIONS

First Office Action for Chinese Application No. 202180095910.0 dated Aug. 20, 2025.
(Continued)

*Primary Examiner* — Waqaas Ali
(74) *Attorney, Agent, or Firm* — Knobbe, Martens, Olson & Bear, LLP

(57) ABSTRACT

A beverage container comprising an outer enclosure made of glass or metal and a hopper part made of glass or metal that is arranged within the outer enclosure. The hopper part defines an upstream volume for untreated beverage and is adapted for holding a capsule for liquid treatment media downstream the upstream volume. The beverage container comprises a hopper holder that is configured to hold the hopper part in the outer enclosure, the hopper holder comprising a hopper holder gasket that is configured to provide a friction fit between the outer enclosure and the hopper part.

16 Claims, 4 Drawing Sheets

(56) References Cited

U.S. PATENT DOCUMENTS

| | | | | |
|---|---|---|---|---|
| 10,011,499 | B2 | 7/2018 | Mayo | |
| 2009/0057220 | A1 | 3/2009 | Nauta | |
| 2010/0243583 | A1 | 9/2010 | Riedel et al. | |
| 2011/0089103 | A1 | 4/2011 | Bommi et al. | |
| 2012/0048787 | A1 | 3/2012 | Rajan et al. | |
| 2012/0061312 | A1 | 3/2012 | Busick et al. | |
| 2017/0007949 | A1 | 1/2017 | Mayo | |
| 2017/0055758 | A1 | 3/2017 | Roth et al. | |
| 2017/0215611 | A1 | 8/2017 | Rinker et al. | |
| 2018/0085690 | A1 | 3/2018 | Chernov et al. | |
| 2018/0273398 | A1 | 9/2018 | Pehar et al. | |
| 2019/0345039 | A1 | 11/2019 | Anderson | |
| 2019/0382283 | A1 | 12/2019 | Pretorius et al. | |
| 2021/0039845 | A1 | 2/2021 | Howard et al. | |
| 2024/0140823 | A1 | 5/2024 | Wahlin | |
| 2024/0341512 | A1 * | 10/2024 | Shepherd | A47G 19/2227 |
| 2025/0100899 | A1 | 3/2025 | Wahlin | |

FOREIGN PATENT DOCUMENTS

| | | | | |
|---|---|---|---|---|
| CN | 111559806 | A | 8/2020 | |
| CN | 214861471 | U | 11/2021 | |
| CN | 114987934 | B * | 10/2023 | B65D 39/0082 |
| DE | 102006006931 | A1 | 8/2007 | |
| DE | 102017121894 | A1 | 3/2019 | |
| EP | 2130799 | A1 | 12/2009 | |
| EP | 2330080 | A1 | 6/2011 | |
| EP | 2674398 | A1 | 12/2013 | |
| EP | 3 012 228 | A1 | 4/2016 | |
| EP | 2130799 | B2 | 10/2016 | |
| EP | 3353081 | A1 | 8/2018 | |
| EP | 2022760 | B1 | 1/2019 | |
| EP | 2407430 | B1 | 2/2020 | |
| JP | H08 294686 | A | 11/1996 | |
| SE | 2150319-8 | | 4/2022 | |
| WO | WO 2014/131905 | A1 | 9/2014 | |
| WO | WO 2016/079303 | A1 | 5/2016 | |
| WO | WO 2017/053588 | A1 | 3/2017 | |
| WO | WO-2023029270 | A1 * | 3/2023 | A45C 11/20 |
| WO | WO 2023/139020 | A1 | 7/2023 | |

OTHER PUBLICATIONS

International Search Report for International Application No. PCT/EP2023/050851 dated Feb. 28, 2023.
Swedish Search Report for Patent Application No. 2250047-4 dated Aug. 24, 2022.
International Search Report for International Application No. PCT/EP2021/085604 dated Apr. 5, 2022.
Swedish Search Report for Patent Application No. 2150319-8 dated Aug. 27, 2021.
Communication pursuant to Article 94(3) EPC dated Jul. 24, 2025.
Office Action dated Jan. 1, 2026 for Chinese Patent Application No. 202380017554X.
Office Action dated May 3, 2026 for Chinese Patent Application No. 202380017554.X.

* cited by examiner

BEVERAGE CONTAINER

CROSS REFERENCE TO RELATED APPLICATION

This application is a U.S. National Phase Application of PCT International Application Number PCT/EP2021/085604, filed on Dec. 14, 2021, designating the United States of America and published in the English language, which claims priority to Sweden Provisional Application No. 2150319-8, filed on Mar. 19, 2021, each of which is hereby expressly incorporated by reference in its entirety for all purposes and forms a part of this specification.

TECHNICAL FIELD

The present disclosure generally pertains to domestic liquid treatment, and more particularly to a hygienic and user-friendly beverage container such as a water purification pitcher.

BACKGROUND ART

Water purification pitchers are commonly used to filter tap water before drinking. These pitchers are typically intended for domestic use and may contain up to a few liters of beverage. Such pitchers may also be referred to as jugs or carafes.

Examples of prior art pitchers are disclosed in EP2674398A1 and US20170215611A1. Prior art pitchers are marred with various drawbacks and problems such as short life, complicated and time-consuming assembly, disassembly and cleaning.

SUMMARY OF THE INVENTION

It is in view of the above considerations and others that the embodiments of the present invention have been made. The present disclosure recognizes the fact that the ability to easily and properly clean prior art pitches may be impaired by their selected shape and the choice of materials. Prior art pitchers are typically entirely made from hard plastic materials that may not allow the pitchers to be washed in a dishwasher. Plastic elements may scratch easily thereby increasing the need for regular cleaning as the scratches promote microbiological growth. Further, prior art pitchers are often designed with several indentions, sharp corners, ribs and similar making the pitchers difficult to clean.

According to the present disclosure, there is provided a beverage container comprising an outer enclosure made of glass or metal and a hopper part made of glass or metal that is arranged within the outer enclosure. The hopper part defines an upstream volume for untreated beverage and is adapted for holding a capsule for liquid treatment media downstream the upstream volume. The beverage container further comprises a hopper holder that is configured to hold the hopper part in the outer enclosure, wherein the hopper holder comprises a hopper holder gasket that is configured to provide a friction fit between the outer enclosure and the hopper part.

As the outer enclosure and the hopper part are made of glass or metal, the major components of the beverage container may be conveniently washed in a dishwasher and even boiled in water if desired. Further, as the outer enclosure and the hopper part form the major part of the beverage container, the beverage container may be essentially free from other materials than glass and metal. In particular, the beverage container may be essentially free of plastic material. Metal and glass may in some aspects be more hygienic than plastic. Also, metal and glass may be more inert than plastic and components made of metal or glass may have a longer life than plastic components.

The outer enclosure and the hopper part may constitute at least 95 percent of the weight of the beverage container, typically at least 99 percent of the weight of the beverage container. Thus, the beverage container may be 95 or even 99 percent free from other materials than glass or metal, such as plastic materials. Thus, the beverage container may be at least 95 or even at least 99 percent free of plastic material.

The hopper holder gasket that provides a friction fit between the outer enclosure and the hopper part allows for large manufacturing tolerances, which may result from the outer enclosure and/or the hopper part being made of glass. Prior art beverage containers or pitchers typically rely on hard plastic snap-fit joints for assembling the components of the beverage containers. The friction fit further allows for uncomplicated and quick assembly and disassembly, the hopper part may be conveniently pushed into the outer enclosure during assembly and pulled out during disassembly. Further, as compared to a snap-fit joint, the friction fit provided by the hopper holder gasket may avoid at least some indentions and sharp corners that promote microbiological growth.

The hopper holder may be arranged at an upper end of the hopper part and the outer enclosure. Thus, the hopper holder may be arranged at a position above any stagnant beverage contained in the beverage container.

The outer enclosure, the hopper part and the hopper holder are separate elements.

The hopper holder gasket may be made of food grade silicone rubber. The hopper holder gasket may be elastically deformable in the transverse or radial direction of the outer enclosure to allow for larger manufacturing tolerances. In particular, the elastic deformability may amount to at least 5 percent of the transverse dimension of the outer enclosure. Such elastic deformability allows for very large manufacturing tolerances, amounting to several percent. In a typical beverage container, the dimension of the outer enclosure would then be allowed to vary several millimeters.

The beverage container may be configured such that the hopper part is arranged within the outer enclosure by pushing the hopper part in the longitudinal direction of the outer enclosure into the outer enclosure, wherein the hopper holder gasket is elastically deformable in the longitudinal direction of the outer enclosure, such that a greater force is required for pulling the hopper part out of the outer enclosure than for pushing the hopper part into the outer enclosure. Such a design may be advantageous if a lid or another component is attached to the hopper part, as it is desirable to be able to remove the lid without removing the hopper part.

The hopper holder gasket may comprise a flange portion that is elastically deformable in the longitudinal direction of the outer enclosure such that the flange portion is bent away from the direction in which the hopper part is pushed, whereby a greater force is required for pulling the hopper part out of the outer enclosure than for pushing the hopper part into the outer enclosure. Such a design is low cost and allows for easy cleaning.

Other designs of the hopper holder gasket that lead to a greater force being required for pulling the hopper part out of the outer enclosure than for pushing it in are conceivable. For example, in lieu of the flange portion there may be provided a plurality of radially extending protrusions such as tongues. Such a hopper holder gasket is, like the above-mentioned one with the flange portion, elastically deformable in the longitudinal direction of the outer enclosure.

The hopper holder gasket may comprise an enclosure vent opening connecting the outer enclosure to the ambient air. Beverage present within the outer enclosure may then conveniently be poured out of the outer enclosure while the enclosure vent opening admits the entrance of air to replace the volume of beverage that has been poured out.

The hopper holder may comprise a hopper support part comprising a projection that is configured to rest on, or hang on, the brim of the outer enclosure, and wherein the hopper support part and the hopper holder gasket are attachable to one another to form the hopper holder.

The hopper holder gasket may be made of an elastic material such as food grade rubber. The hopper support part may be made of a substantially rigid material such as food grade plastic. By combining a hopper holder gasket of elastic material with a hopper support part of a rigid material, the hopper holder may hold the hopper in a friction fit and also in a form fit.

The hopper holder gasket of the hopper holder may provide a friction fit that counteracts movement of the hopper part with respect to the outer enclosure in any direction. The hopper support part may provide a form fit, or positive fit, that hinders the hopper part from being pushed too far into the outer enclosure. An upper end of the hopper part is preferable arranged substantially flush with the upper end of the outer enclosure when the beverage container is assembled.

The hopper support part may comprise a hopper support surface for supporting the hopper part in the longitudinal direction of the outer enclosure. The hopper support surface may provide a form fit between the hopper support part and the hopper part, such that the hopper part may be suspended by, or hang on, the hopper support part. Thus, the hopper part may rest on the hopper support part that rests on the brim of the outer enclosure.

The beverage container may comprise a capsule holder gasket that is configured to provide a friction fit between the hopper part and the capsule for liquid treatment media. The friction fit between the hopper part and the capsule allows for large manufacturing tolerance of the hopper part and of the capsule. This may be advantageous as capsules for liquid treatment media of different providers may differ slightly in dimension.

The capsule holder gasket may be made from food grade silicone rubber. As silicone rubber may be considered not to be a plastic material, the beverage container comprising an outer enclosure made of glass or metal, a hopper part made of glass or metal and such a capsule holder gasket may be considered entirely free from plastic material in contact with stagnant beverage. Silicone rubber may consist exclusively of silicon, oxygen, hydrogen and carbon. Silicone rubber is temperature resistant and does not degrade over time. Silicone rubber may be washed in a dishwasher and even boiled in water.

The capsule holder gasket may be elastically deformable in the transverse or radial direction of the hopper part. The elastic deformability may amount to at least 5 percent of the transverse dimension of the hopper part where the capsule holder gasket is positioned.

The capsule holder gasket may be designed to provide a bellows-function that provides a sealing friction fit with the capsule for liquid treatment media. Said bellows-function may allow for using capsules for liquid treatment media of somewhat different dimensions, and capsules for liquid treatment media having a rough outer surface.

The capsule holder gasket may be configured to provide a bellows-function by the capsule holder gasket comprising capsule gasket body comprising a portion that extends in a longitudinal direction and is elastically deformable in the radial direction.

The capsule holder gasket may comprise a capsule flange that provides a sealing friction fit with the hopper part.

The beverage container may be configured such that a greater force is required for pulling the hopper part out of the outer enclosure than for pulling the capsule for liquid treatment media out of the hopper part.

The beverage container may comprise a lid at least partly covering the outer enclosure. The lid may comprise a lid gasket that is adapted to hold the lid on the beverage container, the lid gasket being configured to provide a friction fit with the hopper part. Thus, the lid may partly cover the outer enclosure and seal the hopper part, more precisely the upstream volume thereof. A user may thus pour treated beverage out of the outer enclosure while untreated beverage is contained within the hopper part, more precisely within the upstream volume of the hopper part.

The beverage container may be configured such that a greater force is required for pulling the hopper part out of the outer enclosure than for pulling the lid out of the hopper part.

The lid gasket allows for large manufacturing tolerances, which may result from the outer enclosure being made of glass. The lid gasket may be elastically deformable in the transverse direction of the outer enclosure to allow for larger manufacturing tolerances. In particular, the elastic deformability may amount to at least 5 percent of the transverse dimension of the outer enclosure.

The lid gasket may be configured to provide a liquid-tight seal between the hopper part, more precisely the upstream volume of the hopper part, and the lid. The lid may comprise a hopper vent conduit connecting the upstream volume of the hopper part to the ambient air. Treated beverage within the outer enclosure may thus be poured out of the outer enclosure without any untreated beverage being poured out of the hopper part. The hopper vent conduit admits the entrance of air into the hopper part such that the untreated beverage may flow through the capsule for liquid treatment media that is arranged downstream the upstream volume.

The hopper vent conduit may be located closer to the center of the lid than to an outer edge of the lid. In this way, the beverage container may be tilted without untreated beverage leaving the hopper part through the hopper vent conduit. If the hopper vent conduit is located at the center of the lid, the beverage container may be tilted to an extent that all treated beverage within the outer enclosure is poured out of the outer enclosure without any untreated beverage leaving the hopper part through the hopper vent conduit. Another advantage with positioning the hopper vent conduit at the center of the lid is that the user may put the lid on the beverage container with the lid oriented at any rotational angle.

The lid may comprise a lid gripping part through which the hopper vent conduit extends. The lid gripping part may extend though the lid and keep the components of the lid together. From a manufacturing point of view, it may thus beneficial to arrange hopper vent conduit within the lid gripping part. The lid gripping part may be located centrally on the lid.

The lid gripping part be made from a precursor of solid metal, such as metal, through which the hopper vent conduit is drilled. The hopper vent conduit may be formed by two blind holes. A first blind hole may be formed through the longitudinal extension of the gripping part, from an internal end of the gripping part. The internal end protrudes from an end of the lid that faces the beverage container. A second blind hole may be formed through the sidewall of the gripping part, at an external end of the gripping part. The external end protrudes from an end of the lid that faces away from the beverage container.

BRIEF DESCRIPTION OF THE DRAWINGS

The present invention will be described further below by way of example and with reference to the enclosed drawings, in which.

DETAILED DESCRIPTION OF EMBODIMENTS

Embodiments of the present disclosure will now be described more fully hereinafter with reference to the accompanying FIGURES. Like reference numbers refer to like elements throughout the description and FIGURES.

Figure 1:
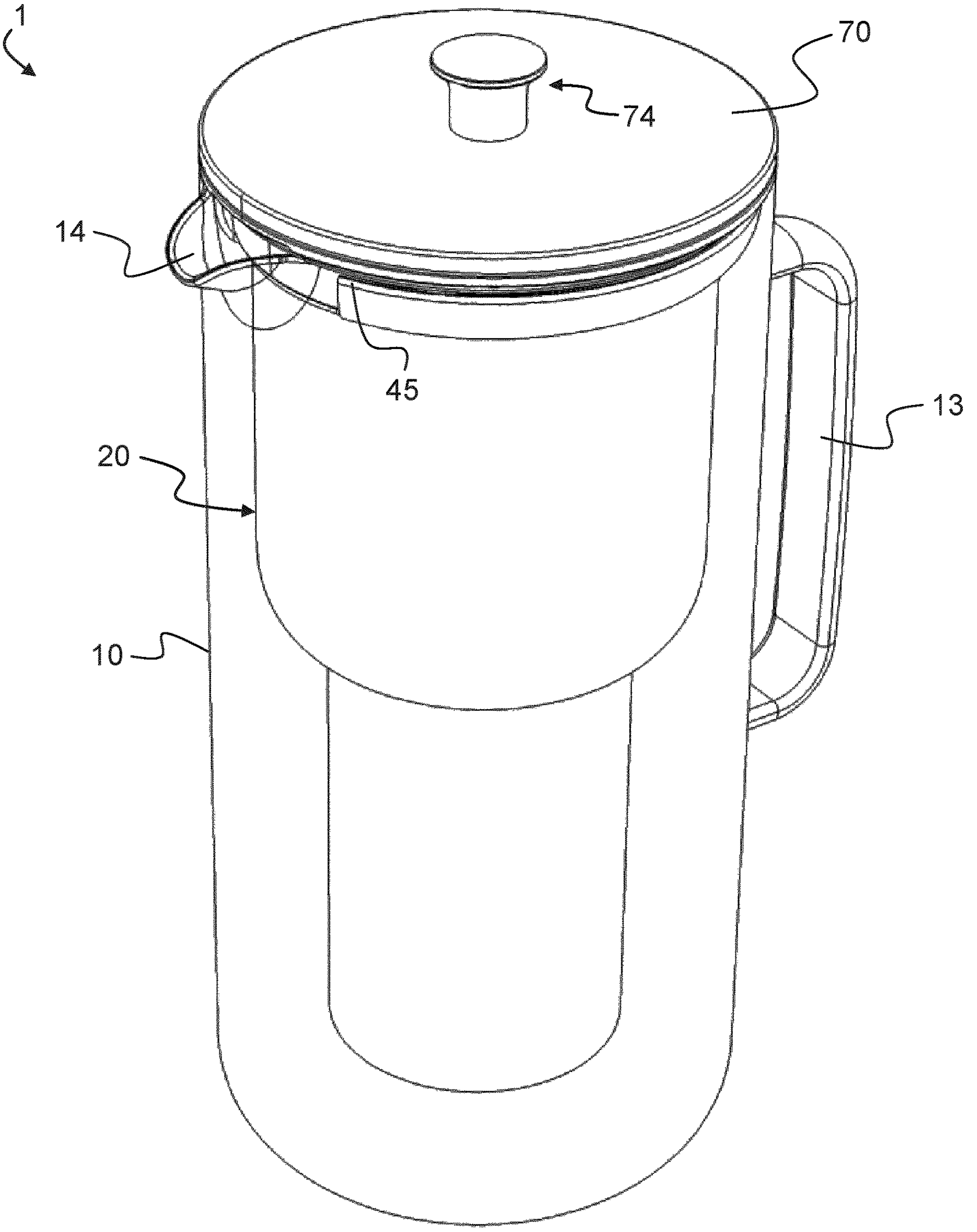
FIG. 1 shows one embodiment of a beverage container 1 with an outer enclosure 10 made of glass, shown are also a lid 70 and a hopper part 20 that is placed within the outer enclosure 10.

FIG. 1 shows a beverage container 1 with an outer enclosure 10 comprising a handle 13 extending from one side thereof. A spout 14 is located radially opposite the handle 13 at the upper brim of the outer enclosure 10. In the present embodiment, the outer enclosure 10 is of circular cross-section. Further, the outer enclosure 10 is cylindrical in shape.

A separate hopper part 20 is arranged within the outer enclosure 10. The hopper part 20 is clearly visible through the outer enclosure 10 as the outer enclosure of the embodiment of FIG. 1 is made of transparent glass 10. A preferred glass is borosilicate glass that has a low thermal expansion coefficient, a relatively high strength and high fracture toughness.

FIG. 1 also shows a lid 70 arranged on top the outer enclosure 10. The lid 70 covers the outer enclosure 10 apart from the spout 14 that protrudes radially out from under the lid 70. The lid comprises a lid gripping part 74 to be gripped by a user when removing the lid 70 from the outer enclosure 10.

Figure 2:
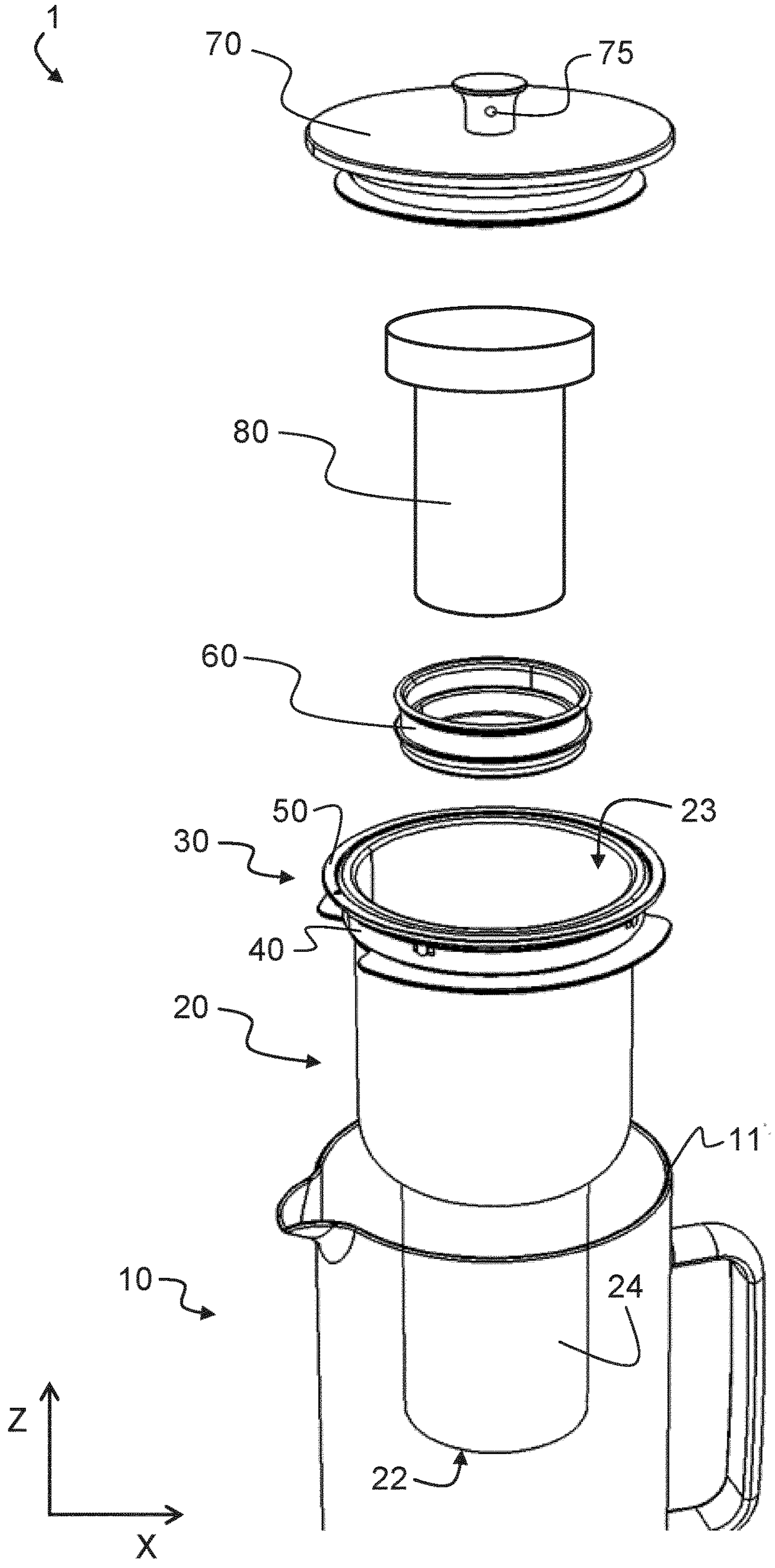
FIG. 2 shows the components of the beverage container of FIG. 1 in exploded view including the lid 70, a capsule holder gasket 60, a hopper holder 30, the hopper part 20 and the outer enclose 10, in addition a capsule 80 for liquid treatment media is schematically illustrated.

FIG. 2 shows the beverage container 1 of the embodiment of FIG. 1 in an exploded view. The hopper part 20 is shown with a separate hopper holder 30 mounted thereto. The hopper holder 30, holding the hopper part 20, is fitted in the outer enclosure 10, as shown in FIG. 1, by the user by hand pushing the hopper part 20 together with the hopper holder 30 along a straight line into the outer enclosure 10. The hopper part 20 and the hopper holder 30 are thereby moved in the longitudinal direction Z of the outer enclosure 10 during assembly of the beverage container 1.

A vertical direction Z is illustrated by the coordinate system shown in FIG. 2. When the beverage container 1 is oriented standing in an upright position, the longitudinal direction of the beverage container 1 coincides with the vertical direction Z. The longitudinal directions of the outer enclosure 10 and the hopper part 20 coincide with the longitudinal direction of the beverage container 1. The transverse or radial direction X of the beverage container coincides with the horizontal direction X of the coordinate system of FIG. 2.

An elastically deformable capsule holder gasket 60 for holding a schematically illustrated capsule 80 for liquid treatment media is also shown in FIG. 2. The capsule holder gasket 60 is fitted in the hopper part 20 by the user pushing the capsule holder gasket 60 by hand along a straight line, along the Z direction, into the hopper part 20. Subsequently, the capsule 80 for liquid treatment media may be pushed into the capsule holder gasket 60 to thus be fitted in the hopper part 20.

Figure 3:
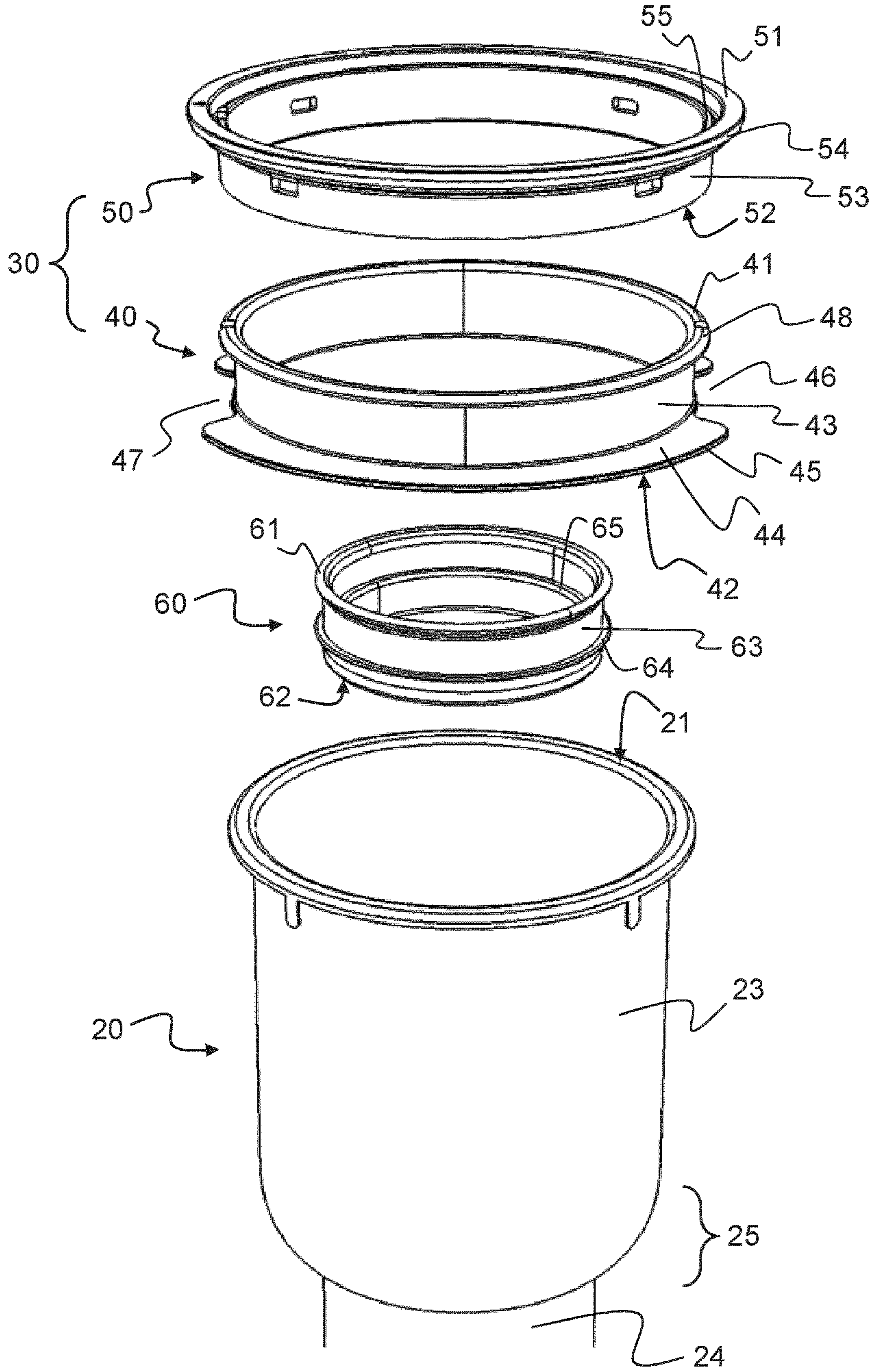
FIG. 3 shows the hopper part 20 of FIG. 1 or 2 with the hopper holder 30 including a hopper holder gasket 40 and a hopper support part 50, and also the capsule holder gasket 60.

FIG. 3 shows the hopper holder 30, the capsule holder gasket 60 and the hopper part 20 in more detail. The hopper part 20 extends from an upper hopper part end 21 to a lower hopper part end 22 (FIG. 2). The hopper part 20 comprises a closed side wall extending from the upper hopper part end 21 to the lower hopper part end 22. In the present embodiment, the hopper part 20 is made of metal sheet. The hopper part 20 defines an upstream volume 23 and a downstream volume 24. The two volumes 23, 24 are of essentially the same height (Z direction). The upstream volume 23 has a diameter that is approximately 1.5 times the diameter of the downstream volume 24. The upstream and downstream volumes 23, 24 are both cylindrical. The diameter of the upstream volume 23 is approximately 80 to 90 percent of the inner diameter of the outer enclosure 10.

A transition region 25 connects the upstream volume 23 to the downstream volume 24. The upstream volume 23, the transition region 25 and the downstream volume 24 are of circular cross-section. The transition region 25 has a continuously narrowing diameter. The hopper part 20 may be designed with a smooth shape to facilitate cleaning thereof. The transition region 25 of the present embodiments is rotational symmetric.

The hopper part 20, comprising the upstream volume 23, the transition region 25 and the downstream volume 24, may be integral, i.e. formed form a single piece of material such as a thin metal sheet. In alternative, the hopper part 20 may be made of for example two or three are hopper part components. Such hopper part components may be fixedly attached to one another, e.g. by welding.

In the present embodiment, the upper hopper part end 21 has a rounded edge. This rounded edge is formed by the wall of the hopper part 20 being bent or rolled outwards to form an upside down U in cross-section.

As is best shown in FIG. 3, the hopper holder 30 comprises two separate elements, namely a hopper holder gasket 40 and a hopper support part 50. The hopper holder gasket 40 is made of a material that is more resilient than the material of the hopper support part 50. A suitable material for the hopper holder gasket 40 is food grade rubber. A suitable material for the hopper support part is a food grade material of higher dimensional stability than a rubber, such as a rigid food grade plastic. As is immediately clear from FIGS. 3 and 1, the hopper holder 30 is in use arranged above any stagnant beverage contained in the beverage container.

The hopper holder gasket 40 is of a generally cylindrical shape. The hopper holder gasket 40 comprises a cylindrical gasket body 43 extending from an upper hopper holder gasket end 41 to a lower hopper holder gasket end 42. At the lower end 42, the hopper holder gasket 40 comprises a flange portion 44 extending radially out from the cylindrical gasket body 43 to a free end 45. At the upper end 41, the hopper holder gasket 40 comprises a rounded portion 48 that is dimensioned to fit inside the rounded edge of the upper hopper part end 21.

In the present embodiment, the flange portion 44 is disc-shaped. In the undeformed state (FIG. 2 or 3), i.e. when the hopper holder gasket 40 is not introduced into the hopper part 20 the flange portion 44 is aligned with the transverse direction X. Thus, the flange portion 44 is orthogonal to the cylindrical gasket body 43.

The flange portion 44 may extend continuously around the entire circumference of the hopper holder gasket 40, but in the present embodiment it comprises an enclosure vent opening 46 and a spout opening 47. These openings 46, 47 are here formed by interruptions in the flange portion 44, but they may in other embodiments be formed as though holes in the flange portion 44.

The spout opening 47 is provided to facilitate a flow of beverage out of the spout 14 of the outer enclosure 10. It is to be understood that the spout 14 may be dimensioned sufficiently large such that the spout opening 47 of the hopper holder gasket 40 may be omitted. The enclosure vent opening 46 is also provided to facilitate the beverage flow out of the spout 14, but by ensuring a flow of air from the ambient environment into the outer enclosure 10 as the beverage is poured out of the outer enclosure 10. The enclosure vent opening 46 of the flange portion 44 may be omitted, e.g. if the spout opening 47 is sufficiently large or if a vent opening for the outer enclosure 10 is provided elsewhere, e.g. through the cylindrical gasket body 43.

In the present embodiment, the enclosure vent opening 46 and the spout opening 47 are arranged radially opposite one another. The hopper holder gasket 40 is symmetric about an axis (Z-direction in FIG. 2) extending along the diameter of the hopper holder gasket 40. has bilateral symmetry. The hopper holder gasket 40 is bilateral symmetric.

As the enclosure vent opening 46 and the spout opening 47 are arranged radially opposite one another, the user who rotationally aligns the spout opening 47 with the spout automatically positions the enclosure vent opening 46 at an optimal location.

The hopper holder gasket 40 provides a friction fit between the outer enclosure 10 and the hopper part 20 to hold the hopper part 20 in place. The hopper holder gasket 40 is preferably adapted to the dimeter of the hopper part 20 such that it fits snugly around the hopper part 20. In view of the elasticity of the hopper holder gasket 40, however, it needs not be exactly adapted to the hopper part 20. The hopper holder gasket 40 is elastically deformable in the transverse or radial direction X (more precisely in the X-Y-plane) of the outer enclosure 10, such that the hopper holder gasket 40 is compressed and deformed between the outer enclosure 10 and the hopper part 20 when the hopper part 20 is inserted into the outer enclosure 10.

As is understood from a comparison of FIGS. 3 and 1, the hopper holder gasket 40 is bent towards the brim 11 of the outer enclosure 10 when the hopper part 20 is pushed into the outer enclosure 10. More precisely, it is the flange portion 44 that is bent towards the brim 11 in the deformed state of the hopper holder gasket 40. FIG. 1 shows the free end 45 of the flange portion 44 pointing towards the brim 11 of the outer enclosure 10, i.e. upwards in the longitudinal direction Z. In other words, the hopper holder gasket 40, more precisely its flange portion 44, is elastically deformable in the transverse direction X (and in the longitudinal direction Z as is described below) of the outer enclosure 20.

Thanks to the substantial length of the flange portion 44 in the transverse direction X, the deformation in the transverse direction amounts to approximately 10-15 percent of the diameter of the outer enclosure 10. Such a large deformation allows for large manufacturing tolerances of the outer enclosure 10 and of the hopper part 20 that are held together in a friction fit by the hopper holder gasket 40.

As the hopper holder gasket 40, more precisely its flange portion 44, is bent towards the brim 11 of the outer enclosure 10 when the hopper part 20 is pushed into the outer enclosure 10, the hopper holder gasket 40 is elastically deformable in the longitudinal direction Z of the outer enclosure 20. When a user pulls the hopper part 20 and the hopper holder 30 out of the outer enclosure 10, either by pulling the hopper part 20 internally or by gripping the hopper holder 30 through the spout 14, the bent flange portion 44 will be affected by frictional forces from the inner surface of the outer enclosure 10. Said frictional forces will act to straighten the bent flange portion 44 whereby the flange portion 44 will be increasingly pressed internally against the outer enclosure 10. It follows that the flange portion 44 of the hopper holder gasket 40 will act to hinder the hopper part 20 from being pulled out of the outer enclosure 10. Thus, the force required for pulling the hopper part 20 out of the outer enclosure 10 is greater than the force required for pushing the hopper 20 part into the outer enclosure 10.

In other embodiments (not shown) the flange portion 44 may be replaced by a plurality of tongues that extend radially similar to the flange portion 44. Such tongues may be elastically deformable (in the longitudinal direction Z) in the same manner as the flange portion 44 and thus render the force required for pulling the hopper part 20 out of the outer enclosure 10 greater than the force required for pushing the hopper 20 part into the outer enclosure 10.

Turning again to FIG. 3, the hopper support part 50 of the present embodiment is of a generally cylindrical shape and extends from an upper hopper support part end 51 to a lower hopper support part end 52. The hopper support part 50 comprises an essentially cylindrical support part body 53. More precisely, the inner surface of the support part body 53 is cylindrical whereas the outer surface of the support part body 53 is slightly frustro-conical. In other words, the outer circumferential surface of the support part body 53 is slightly inclined radially inwards.

At the upper end of the support part body 53, a projection 54 is formed which is sized to rest on the brim 11 of the outer enclosure 10. In the present embodiment, the projection 54 is ring-shaped and has the same outer diameter as that of the outer enclosure 10. The projection 54 forms the upper hopper support part end 51 and the lower edge of the support part body 53 forms the lower hopper support part end 52.

In the present embodiment, the upper end 51 of the support part body 53 forms a hopper support surface 55 for the rounded portion 48 of the hopper holder gasket 40. As has been mentioned, the rounded portion 48 fits inside the rounded edge of the upper hopper part end 21. Thus, the hopper part 20 may rest on the hopper support surface 55.

It follows that the hopper support part 50 hinders the hopper part 20 from being pushed too far into the outer enclosure 10. The hopper part 20 is supported on the brim 11 of the outer enclosure 10 by a form fit provided by the hopper support part 50.

The hopper holder gasket 40 and the hopper support part 50 are attachable to one another by the hopper support part 50 being passed over the hopper holder gasket 40. Once assembled, the elastic hopper holder gasket 40 is kept in place on the hopper support part 50 by the flange portion 44 abutting against the lower hopper support part end 52 and the rounded portion 48 abutting against the hopper support surface 55.

Thus, the hopper holder gasket 40 comprises an upper radial element (rounded portion) 48 and a lower radial element (flange portion) 44 which securely hold the hopper support part 50 in place on the hopper holder gasket 40. Once assembled, the cylindrical gasket body 43 encircles the support part body 53, and the hopper holder gasket 40 and the hopper support part 50 are also held together by frictional forces between the cylindrical gasket body 43 and the support part body 53.

The capsule holder gasket 60 shown in FIGS. 2 and 3 is in the disclosed embodiment configured to rest in an annular receiving section (not shown) located within the downstream volume 24. During assembly, the capsule holder gasket 60 may be fitted in the hopper part 20 by the user pushing the capsule holder gasket 60 into the annular receiving section. The beverage container 1 and the capsule 80 for liquid treatment media are designed such that the capsule 80 for liquid treatment media is held downstream the upstream volume 23 of the hopper part 20.

The capsule 80 for liquid treatment media will occupy an upper portion of the downstream volume 24 of the hopper part 20 and the transition region 25. The capsule 80 may also project into the upstream volume 23.

The capsule holder gasket 60 and the hopper part 20 are configured such that untreated beverage, e.g. tap water, filled into the upstream volume 23 will be drawn by gravity through the capsule 80 for liquid treatment media and exit the downstream volume 24 to be collected in the outer enclosure 10.

As is best shown in FIG. 3, the capsule holder gasket 60 is of a generally cylindrical shape. The capsule holder gasket comprises a generally cylindrical capsule gasket body 63 extending longitudinally from an upper capsule holder gasket end 61 to a lower capsule holder gasket end 62. At the upper capsule holder gasket end 61, the capsule holder gasket 60 is slightly inclined radially outwards.

In the present embodiment, the capsule gasket body 63 is not of constant wall thickness. A lower portion of the capsule gasket body 63 has a wall thickness that is 2-3 times the wall thickness an upper portion of the capsule gasket body 63. At the lower portion of the capsule gasket body 63, there is provided a sealing capsule flange 64 extending radially out from the capsule gasket body 63. The capsule flange 64 extends in the transverse direction X and is deformable in the transverse direction. Said deformation may amount to approximately 10 percent of the outer diameter of the capsule holder gasket 60. The capsule flange 64 provides a friction fit between the capsule holder gasket 60 and the hopper part 20.

The increased wall thickness of the lower portion of the capsule gasket body 63 results in an increased stiffness, which may be beneficial for attaching the capsule holder gasket 60 in the hopper part 20. The lower portion of the capsule holder gasket 60 may be received, i.e. form fitted, in the annular receiving section (not shown) of the downstream volume 24. The lower (thicker) portion of the capsule gasket body 63 provides a seat 65 on which the capsule 80 for liquid treatment media may rest. Thus, the seat 65 provides a form fit for the capsule 80.

The upper portion of the capsule gasket body 63 has a relatively thin wall thickness such that it is deformable in the radial direction X. The upper portion of the capsule gasket body 63 extends from the lower (thicker) portion of the capsule gasket body 63 to the upper capsule holder gasket end 61 that is inclined radially outwards such that it may rest against the inner wall of the hopper part 20. More precisely, said upper capsule holder gasket end 61 is adapted to rest against the inner wall of the wall forming the downstream volume 24 of the hopper part 20. In this way, the upper (thinner) portion of the capsule gasket body 63 is elastically deformable in radial direction and provides a bellows function. The upper portion of the capsule gasket body 63 provides a friction fit between the capsule holder gasket 60 and the capsule 80 for liquid treatment media. It has been realized that the presently designed capsule holder gasket 60, more precisely the upper portion of the capsule gasket body 63, functions as a bellow to tightly seal between the hopper part 20 and the capsule 80 for liquid treatment media. This bellows-function is especially advantageous as it allows for use of capsules 80 for liquid treatment media of somewhat different dimensions. In addition, the present capsule holder gasket 60 may provide a tight seal even if a capsule 80 for liquid treatment media has a rough surface, which may be the result of an ultrasound-welded capsule 80 for liquid treatment media.

Figure 4:
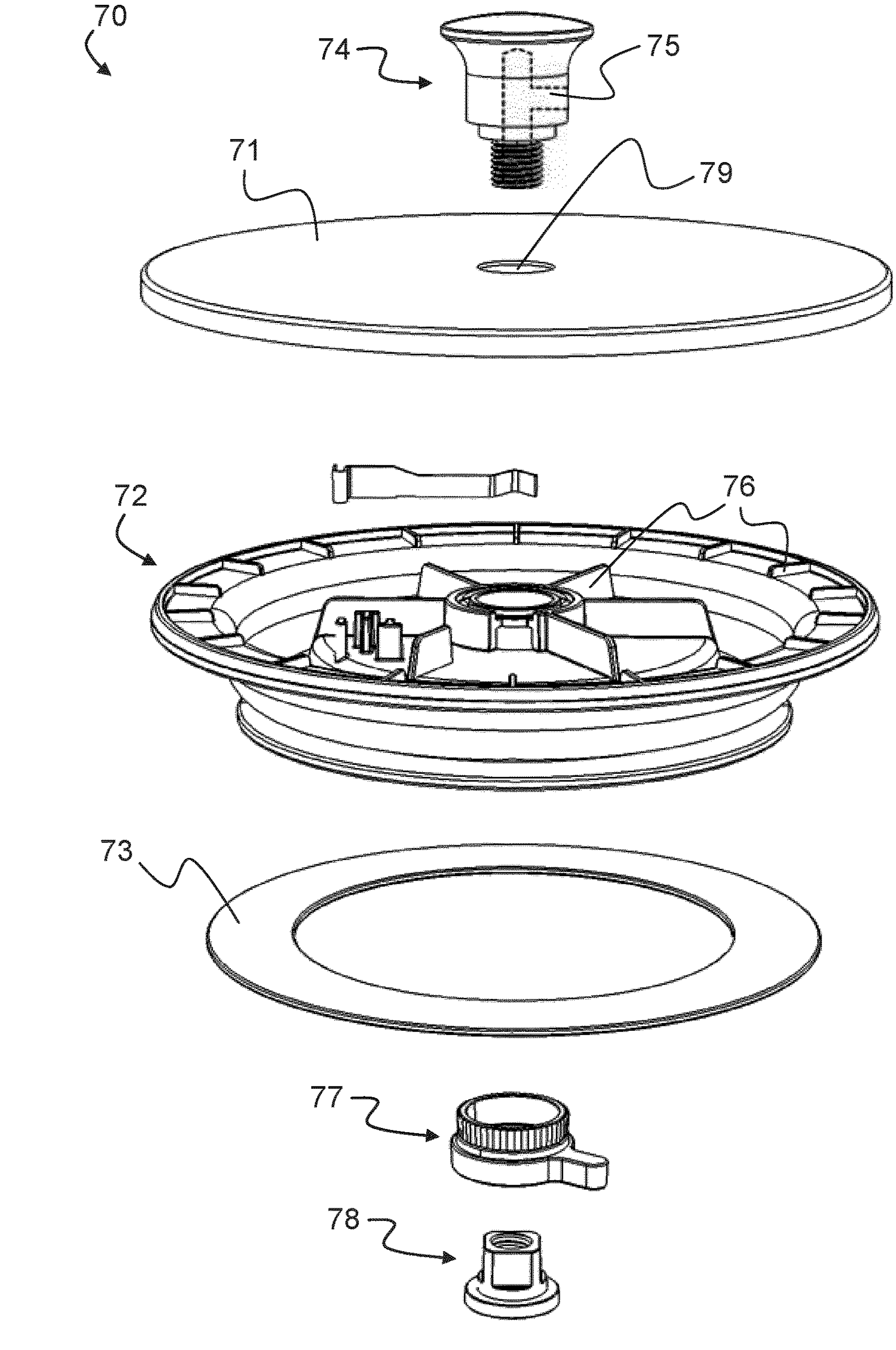
FIG. 4 shows the lid 70 of FIG. 1 or 2 in more detail.

FIG. 4 shows the lid 70 in an exploded view. The lid 70 comprises a circular, disc-shaped top cover plate 71 that in the present embodiments is made of thin metal sheet. The top cover plate 71 has essentially the same dimension as the outer enclosure 10. The top cover plate 71 is attached to a lid support part 72. In the present embodiment, the lid support part 72 is made from rigid food grade plastic.

The lid support part 72 is essentially cup-shaped and is adapted to rest on top the projection 54 of the hopper support part 50. The lid support part 72 has an internal strengthening structure 76 in the form of ribs and attachment members for the components of the lid 70.

An elastically deformable gasket 73 is attached to a lower portion of the lid support part 72. A suitable material for the lid gasket 73 is food grade rubber. The lid gasket 73 is ring-shaped and flat. The lid gasket 73 is attached to the lid support part 72 by being fitted in a groove on the lid support part 72. The lid gasket 73 is elastically deformable in the transverse direction X of the hopper part 20, the deformation in the transverse direction amounts to approximately 10-15 percent of the diameter of the hopper part 20. Thus, the lid gasket 73 allows for large manufacturing tolerances of the hopper part 20.

The lid gripping part 74 is attached to the center 79 of the lid 70. The lid gripping part 74 protrudes up from the lid 70 such that a user may grip the lid gripping part 74 to remove the lid from the beverage container 1. In the present embodiment, the lid gripping part 74 is elongate, knob-shaped and extends through the cover plate 71 and the lid support part 72. Thus, the lid gripping part 74 comprises an external (upper) end that, when assembled, is located on the external side of the lid 70 and an internal (lower) end that, when assembled, is located on the internal side of the lid 70.

As is shown in FIG. 4, both the top cover plate 71 and the lid support part 72 are closed structures, thus liquid-tight, apart from central openings. A threaded attachment portion of the gripping part 74 extends through these openings of the top cover plate 71 and the lid support part 72. The threaded attachment portion is adapted to engage a threaded nut 78 on the internal (lower) side of the lid support part 72. Thus, the top cover plate 71 and the lid support part 72 are attached to one another by the nut 78 being screwed to the threaded attachment portion of the gripping part 74. In the present embodiment, the lid gasket 73 is adapted to form a liquid-tight seal between the hopper part 20, more precisely the upstream volume 23 thereof, and the lid support part 72. A hopper vent conduit 75 is lead through the lid gripping part 74. The hopper vent conduit 75 may be formed by drilling a first blind hole into the internal end of the lid gripping part 74, i.e. in the longitudinal direction Z. A second blind hole may be formed by drilling a second blind hole into the sidewall of the lid gripping part 74 at the external side. A hopper vent conduit 75 through the lid gripping part 74 formed by such first and second blind holes is illustrated by the dashed lines in FIG. 4. As an alternative, a hopper vent conduit may be formed by a straight through-hole through the lid gripping part 74, i.e. in the longitudinal direction Z.

The lid 70 covers the outer enclosure 10 but does not seal the outer enclosure; treated beverage may be poured out of the beverage container 1 without opening or removing the lid 70. The lid 70 seals the upstream volume 23 of the hopper part 20 such that untreated beverage within the upstream volume 23 does not leak out when treated beverage is poured out from the beverage container 1. Thus, a user may pour treated beverage out from the beverage container 1 also when there is untreated beverage within the beverage container 1. The hopper vent conduit 75 is provided to allow air into the upstream volume 23 of the hopper part 20 such that the untreated beverage within the upstream volume 23 may flow down through the capsule 80 for liquid treatment media and into the outer enclosure 10.

In the present embodiment, as is clear from FIGS. 2 and 4, the hopper vent conduit 75 is located at the center 79 of the lid 70. As a result, the beverage container may be tilted 90 degrees without any untreated beverage exiting the upstream volume 23 through the hopper vent conduit 75. Thus, a user may pour all treated beverage out from the beverage container 1 also when there is untreated beverage within the beverage container 1. Further, the user may attach the lid 70 to the outer enclosure 10 with the lid 70 oriented at any rotational angle. When the hopper vent conduit 75 is arranged to exit the lid gripping part 74 at a lateral sidewall of the lid gripping part 74, as is shown in FIGS. 2 and 4, an upwards open vent conduit is avoided. Thereby, there is less risk that the vent conduit becomes clogged by dirt or blocked by an object placed on top of the beverage container 1.

FIG. 4 shows a date indicator 77 rotationally attached to the lid support part 72 by the threaded attachment portion of the gripping part 74 and the nut 78. The capsule 80 for liquid treatment media is to be exchanged after a period of use, such as a month of a few months. When the user exchanges the capsule 80 for liquid treatment media, the user may set the date indicator 77 to point to the current month to register the exchange. The inner surface of the lid support part 72 is provided with a pattern (not illustrated herein) showing the months or weeks of a year.

FIG. 4 illustrates a spring held in place by the internal strengthening structure 76. This spring exerts a force on the date indicator 77 to hinder the date indicator 77 from unintentional rotation. As is shown, the date indicator 77 may be provided with a rough outer surface that cooperated with the spring.

Even though the lid 70 as described above is specially adapted to cooperate with the outer enclosure 10 and the hopper part 20 of the present beverage container 1, the lid 70 may be used as a lid for other beverage containers, including beverage containers lacking a hopper part and means for liquid treatment.

As has been mentioned, the hopper holder 30 comprises an elastically deformable hopper holder gasket 40 and a rigid hopper support part 50. Similarly, the lid 70 comprises an elastically deformable lid gasket 73 and a rigid lid support part 72. Like the hopper holder gasket 40 and the lid gasket 73, the capsule holder gasket 60 is elastically deformable.

In the context of the present disclosure, the elastically deformable components 40, 73, 60 are elastically deformable such that they made provide a friction fit. The material of the elastically deformable components 40, 73, 60 may have a Shore A hardness of 50-80, where the interval of 65 to 75 may be especially suitable. The elastically deformable components may be made of food grade rubber, such as food grade silicone rubber.

The rigid components 50, 72 have a higher Shore A hardness than the elastically deformable components. The rigid components may be made of rigid food grade plastic, such as food grade polycarbonate or food grade styrene acrylonitrile resin (SAN).

The hopper part 20 and the hopper holder 30 may comprise means to prevent a mutual rotation there between. FIG. 3 shows such optional lugs or ears depending down from the upper hopper part end 21 and optional complementary openings on the support part body 53.

In the embodiments described herein, the outer enclosure 10 is of circular cross-section. In other embodiments, the outer enclosure may be of non-circular cross-section, e.g. an essentially elliptic or polygonal cross-section. In such embodiment, the hopper part may either have a similar non-elliptic cross section as the outer enclosure, or may be of circular cross section as in the embodiments described herein.

In embodiments where the outer enclosure and the hopper part have cross section of different shape in the area where the hopper holder is located, the hopper holder may have a radially outer shape that conforms to the outer enclosure and a radially inner shape that conforms to the hopper part. Thus, a hopper part of circular cross-section may be used together with an outer enclosure of non-circular cross-section.

The invention claimed is:

1. A beverage container comprising:

an outer enclosure made of glass or metal;

a hopper part made of glass or metal that is arranged within the outer enclosure, wherein the hopper part defines an upstream volume for untreated beverage and is adapted for holding a capsule for liquid treatment media downstream the upstream volume; and a hopper holder that is configured to hold the hopper part in a fixed position in the outer enclosure, the hopper holder comprising a hopper holder gasket that is configured to provide a friction fit between the outer enclosure and the hopper part, wherein the hopper holder gasket is configured such that a greater force is required for pulling the hopper part out of the outer enclosure than for pushing the hopper part into the outer enclosure;

wherein the hopper holder comprises a hopper support part comprising a projection at an upper end of the hopper support part that is configured to rest on a brim of the outer enclosure, and wherein the hopper support part and the hopper holder gasket are attachable to one another to form the hopper holder; wherein the upstream volume of the hopper part is configured to extend downward and into the outer enclosure.

2. The beverage container of claim 1, wherein the hopper holder gasket is elastically deformable in a transverse direction of the outer enclosure.

3. The beverage container of claim 2, wherein the elastic deformability amounts to at least 5 percent of a transverse dimension in the transverse direction of the outer enclosure.

4. The beverage container of claim 2, wherein the beverage container is configured such that the hopper part is arranged within the outer enclosure by pushing the hopper part in a longitudinal direction of the outer enclosure into the outer enclosure, and wherein the hopper holder gasket is elastically deformable in the longitudinal direction of the outer enclosure.

5. The beverage container of claim 4, wherein the hopper holder gasket comprises a flange portion that is elastically deformable in the longitudinal direction of the outer enclosure such that the flange portion is bent away from the direction in which the hopper part is pushed.

6. The beverage container of claim 1, wherein the hopper holder gasket comprises an enclosure vent opening connecting the outer enclosure to ambient air.

7. The beverage container of claim 1, wherein the hopper support part comprises a hopper support surface for supporting the hopper part in a longitudinal direction of the outer enclosure.

8. The beverage container of claim 1, further comprising a capsule holder gasket that is configured to provide a friction fit between the hopper part and the capsule for liquid treatment media.

9. The beverage container of claim 8, wherein the capsule holder gasket is made from food grade silicone rubber.

10. The beverage container of claim 8, wherein the capsule holder gasket is elastically deformable in a transverse direction of the hopper part.

11. The beverage container of claim 1, further comprising a lid at least partly covering the outer enclosure, wherein the lid comprises a lid gasket that is adapted to hold the lid on the beverage container, the lid gasket being configured to provide a friction fit with the hopper part.

12. The beverage container of claim 11, wherein the lid gasket is configured to provide a liquid-tight seal between the hopper part and the lid, and wherein the lid comprises a hopper vent conduit connecting the upstream volume to ambient air.

13. The beverage container of claim 12, wherein the hopper vent conduit is located closer to a center of the lid than to an outer edge of the lid.

14. The beverage container of claim 13, wherein the lid comprises a lid gripping part through which the hopper vent conduit extends.

15. The beverage container of claim 1, wherein the hopper part defines a downstream volume, the downstream volume and the upstream volume comprising the same height.

16. The beverage container of claim 1, wherein the hopper holder is configured to hold the hopper part in a fixed position during treatment of liquid with the liquid treatment media.

* * * * *